UNITED STATES PATENT OFFICE.

CHARLES GUSTAVE MUELLER, OF NEW YORK, N. Y.

COMPOSITION FOR EXTINGUISHING FIRES.

Specification forming part of Letters Patent No. 27,375, dated March 6, 1860.

*To all whom it may concern:*

Be it known that I, CHARLES GUSTAVE MUELLER, of the city, county, and State of New York, have invented a new and Improved Composition for Extinguishing Fires; and I do hereby declare that the following is a full, clear, and exact description of the same.

The object of this invention is to produce a composition which, by the quantity of non-combustible gases emanating from the same when lighted, will serve to extinguish fires in rooms which are partially or entirely closed; and my invention consists in a composition of charcoal, sulphur, niter, sugar, and red lead, which ingredients I mix together about in the following porportion: charcoal, two ounces; sulphur, fifty-three ounces; niter, one hundred and eighteen ounces; sugar, four ounces; red lead, thirty and two-third ounces. Each of these ingredients is reduced to fine powder, and in this state they are mixed together, and a small guantity of water or alcohol is added, just sufficient to moisten the whole and to produce a thick dough. When thoroughly mixed I subject my composition to the action of a hydraulic press, whereby the moisture is completely expelled, and at the same time by the action of the press the composition is formed into round cakes with a corrugated surface and provided with an indenture or recess to receive one end of a fuse. When perfectly dry the cakes are now brushed over with a watery solution of gunpowder to increase their capacity to ignite, and thus prepared they are placed into tin boxes made expressly for this purpose and which fit closely to the cakes. The inside of said boxes is covered with a fire-proof coating, and they are furnished with an aperture in their sides to admit a fuse, one end of which is fastened to the recesses in the cakes and the other end extending to the outside of the box is covered over together with the box with paper and varnish, so as to protect it from moisture. The fire-proof lining on the inside of the boxes is intended to protect their contents against the influence of heat to which they might accidentally be subjected, and also to prevent the heat generated by the burning of the composition from making the boxes red hot. The cover of the box is put on and fastened by means of glue or solder, and in order to insure an easy burning of the composition without bursting the box a circular hole is cut out of the cover to about five-eighths of an inch to the rim, and a plate somewhat larger than the hole is now fastened over the same by means of glue, the paper which covers the box assisting in keeping the same in its place. Thus my composition is put up in a form at once safe, compact, easy of transportation, and readily managed by any person of ordinary understanding. If a fire breaks out in a room, nothing is to be done but to light the outer end of the fuse by a match and the composition will begin to burn off. The plate on the cover is easily removed so as to allow the composition to burn readily.

The ingredients which constitute my composition are mixed together in such a proportion that the same contains within itself a sufficient quantity of oxygen to consume the combustible portion of its ingredients and to transform the same into a very large mass of gases which by their non-combustible nature serve to smother the fire which may have originated in a room or other closed space.

What I claim as new, and desire to secure by Letters Patent, is—

The within-described composition of charcoal, sulphur, niter, sugar, and red lead mixed together in the proportion herein specified, for the purpose of extinguishing fires.

CHARLES GUSTAVE MUELLER.

Witnesses:
W. HAUFF,
J. F. BUCKLEY.